(12) United States Patent
Bärnreuther et al.

(10) Patent No.: US 9,137,332 B2
(45) Date of Patent: Sep. 15, 2015

(54) METHOD, COMPUTER READABLE MEDIUM AND SYSTEM FOR GENERATING A USER-INTERFACE

(71) Applicants: Rainer Bärnreuther, Nürnberg (DE); Ivan Murphy, Baiersdorf (DE)

(72) Inventors: Rainer Bärnreuther, Nürnberg (DE); Ivan Murphy, Baiersdorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 272 days.

(21) Appl. No.: 13/723,247

(22) Filed: Dec. 21, 2012

(65) Prior Publication Data

US 2014/0181177 A1    Jun. 26, 2014

(51) Int. Cl.
*G06F 15/16* (2006.01)
*H04L 29/06* (2006.01)

(52) U.S. Cl.
CPC ...................................... *H04L 67/42* (2013.01)

(58) Field of Classification Search
USPC ................... 709/203, 206, 219, 223
See application file for complete search history.

(56) References Cited

U.S. PATENT DOCUMENTS

| 6,564,256 B1* | 5/2003 | Tanaka | 709/219 |
| 2010/0138509 A1* | 6/2010 | Castaldi et al. | 709/206 |
| 2013/0138717 A1* | 5/2013 | Lingley | 709/203 |
| 2013/0204976 A1* | 8/2013 | Okuyama et al. | 709/219 |

* cited by examiner

*Primary Examiner* — Kyung H Shin
(74) *Attorney, Agent, or Firm* — Harness, Dickey & Pierce, P.L.C.

(57) ABSTRACT

A method, computer readable medium and system are disclosed. An embodiment of the method includes obtaining, by a single client, a request for data from a patient browser; querying, by the single client, at least one of a plurality of servers for the requested data, each of the plurality of servers hosting a different imaging application, the imaging applications being independent of each other, receiving, by the single client, an indication, the indication indicating that a first server of the plurality of servers contains the requested data and retrieving, by the single client, the requested data such that the associated server is transparent to the user. The different imaging applications may be different versions of the same imaging application, different applications or different imaging applications being based on different versions of the same product-line code.

16 Claims, 5 Drawing Sheets

METHOD, COMPUTER READABLE MEDIUM AND SYSTEM FOR GENERATING A USER-INTERFACE

BACKGROUND

1. Field

Embodiments generally relate to user interfaces for computer-based applications.

2. Related Art

Large systems (e.g., medical systems like medical imaging devices and hospital management systems) include multiple products from different origins (e.g., business units with specific applications). These products are developed independently but use common product-line code, for example, for common look and feel, run-time infrastructures, data repositories, and domain specific protocols and tech-stacks.

On the one hand, the products are intended to be independent of each other, have internal product variability, extensibility, deployments on multiple physical or virtual machines. On the other hand, applications from these independent products have considerable technical dependencies among each other, due to large amount of common product-line code that sits in such an application, and because applications from two independent products often need tighter technical coupling for specialized medical diagnostics (e.g., MR+MI, CT+MI), or at least need a joint deployment on the same hardware box and software run-time system, due to, for example, cost constraints.

In many cases, a same application can be installed in many versions. The user selects a version by manual selection or by always using the own installation path. This is the default solution used by all vendors, like Microsoft Visual Studio application and .NET frameworks, Java Run-Time, Perl programming language, Adobe Reader application, and many more. Some software force the user to first install the correct version of their underlying run-time system, for example, the required version of the Java run-time, regardless of potential side-effects on other Java based software on the same machine. Some software even refuse to exist more than once on a machine and force the user to remove previous versions of the same product, like Microsoft Windows or releases of SAP's enterprise software.

For example, a client can support only one version of the application installed on the client hardware at any one time. If a user of the client desires to work with a different application version, the user has to use either a different client or the use has to uninstall the installed version and install the version to be used.

SUMMARY

The inventors have recognized, in the context of deploying various applications for a client, the existing solutions can be burdensome on the user and may increase the amount of time spent on the client to use a requested version of an application.

The inventors have discovered that using client software that does not consist of a one monolithic uniform version improves the usability of a user interface (UI) on the client. More specifically, the inventors have discovered a method, system and computer readable medium where a user is not aware of the version of the imaging application being displayed on the user interface, thus removing the requirement that a user select a version of an application or installing a different version of the application on the client.

The client software is divided into multiple processes such as a UI container process hosting a patient browser, an image call-up process and multiple imaging processes. Each imaging process is an imaging application which is independent of the other imaging applications and is also independent of the version of the patient browser.

The UI container process is also used to host the imaging application UI in order to give the user the impression that the user is working with an integrated system. In other words, different versions of the same imaging application are display in a single UI container process.

One example embodiment discloses a method of generating a user interface for a computer-based application. The method includes obtaining, by a single client, a request for data from a patient browser, querying, by the single client, at least one of a plurality of servers for the requested data, each of the plurality of servers hosting a different imaging application, the imaging applications being independent of each other, receiving, by the single client, an indication, the indication indicating that a first server of the plurality of servers contains the requested data and retrieving, by the single client, the requested data such that the associated server is transparent to the user.

In an example embodiment, the method further includes displaying the requested data.

In an example embodiment, the different imaging applications are different versions of the same imaging application. In another example embodiment, the different imaging applications are different versions of different imaging applications being based on different versions of the same product-line code.

In an example embodiment, the method further includes querying the first server to determine a version of the imaging application associated with the first server.

In an example embodiment, the user does not select the version of the imaging application associated with the server containing the requested content.

In an example embodiment, the method further includes hosting, by a user interface container in the client, the patient browser and a plurality of imaging interfaces, the plurality of imaging interfaces associated with the imaging applications, respectively.

In an example embodiment, the request identifies a patient.

In an example embodiment, the method further includes querying the plurality of servers to determine patients and displaying, by the client, the patients.

An example embodiment discloses a non-transitory computer readable medium configured to be executed on a computer. The non-transitory computer readable medium includes a user-interface container configured to host a patient browser, and a plurality of imaging applications, each of the imaging applications being independent and associated with a server, the user-interface container configured to display the patient browser and data in at least a first server of the plurality of servers, a location of the first server being transparent to the user.

In an example embodiment, the computer readable medium further includes an image call-up configured to cause the computer to query the first server and initiate the imaging application associated with the first server.

In an example embodiment, the image call-up is configured to cause the computer to connect to the first server and load the data.

In an example embodiment, the user-interface container is configured to cause the computer to display the data.

An example embodiment discloses a processor in a client configured to obtain a request for data from a patient browser, query a plurality of servers for the requested data, each of the plurality of servers hosting a different imaging application, the imaging applications being independent of each other, receive an indication, the indication indicating that a first server of the plurality of servers contains the requested data and retrieve the requested data such that the associated server is transparent to the user.

In an example embodiment, the different imaging applications are different versions of the same imaging application.

In an example embodiment, the processor is configured to query the first server to determine a version of the imaging application associated with the first server.

In an example embodiment, the user does not select the version of the imaging application associated with the server containing the requested content.

In an example embodiment, the processor is configured to host the patient browser and a plurality of imaging interfaces, the plurality of imaging interfaces associated with the imaging applications, respectively.

In an example embodiment, the processor is configured to query the plurality of servers to determine patients and display the patients.

Alternative example embodiments may be implemented as a computer program product for use with a computer system, the computer program product being, for example, a series of computer instructions, code segments or program segments stored on a tangible or non-transitory data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions, code segments or program segments can constitute all or part of the functionality of the methods of example embodiments described above, and may also be stored in any memory device, volatile or non-volatile, such as semiconductor, magnetic, optical or other memory device.

BRIEF DESCRIPTION OF THE DRAWINGS

In the detailed description of example embodiments given herein below and the accompanying drawings, like elements are represented by like reference numerals, which are given by way of illustration only and thus are not limiting of example embodiments and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium. A processor(s) will perform the necessary tasks.

Specific structural and functional details disclosed herein are merely representative for purposes of describing example embodiments of the present invention. Example embodiments may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Figure 1:
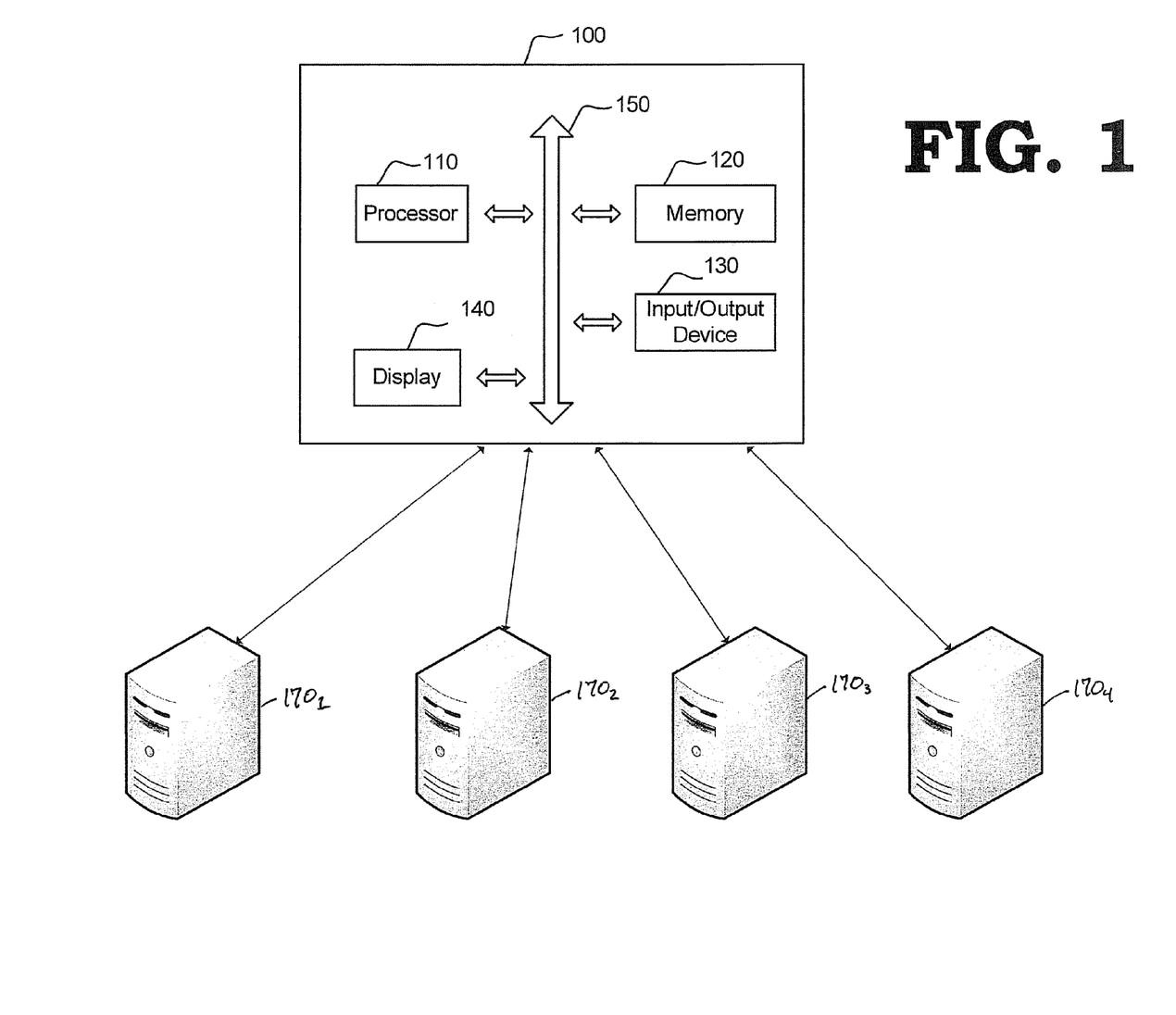
FIG. 1 illustrates a system according to at least one example embodiment.

FIG. 1 illustrates a system according to an example embodiment. The system includes a client 100 and servers $170_1$, $170_2$, $170_3$ and $170_n$. While four servers are illustrated, the system of FIG. 1 is not limited to four servers. The system may include more or less than four servers. Moreover, the elements shown in FIG. 1 are for the purposes of discussing an example embodiment and the system of FIG. 1 should not be limited to the features shown therein.

As shown in FIG. 1, the client 100 includes a processor 110, an input/output device 130, a memory 120 and a display 140. The client 100 may be a computer, for example.

The processor 110, input/output device 130, memory 120 and display 140 may perform data communication with each other by using a bus 150. The processor 110 may execute a program by accessing the memory 120 through the bus 150. The input/output device 130 may be used to input/output data to/from the client 100. The client 100 may connect to external devices, e.g. the servers $170_1$-$170_n$, by using the input/output device 130 and may exchange data with the external devices. The display 140 may display a user interface based on commands received from a user of the client 100 and/or commands received from the processor 110.

The memory 120 may store codes or programs for operations of the processor 110. For example, the memory 120 may include a data structure including instructions to execute the method described below in reference to FIG. 2. The memory 120 may store a user-interface container configured to host a patient browser and a plurality of imaging applications. Each of the imaging applications is independent and associated with one of the servers $170_1$-$170_n$. The user-interface container is configured to display the patient browser and data in at least a first server of the plurality of servers. A location of the first server is transparent to the user. The memory 120 may further store an image call-up configured to cause the client 100 to query the first server and initiate the imaging application associated with the first server. The image call-up is configured to cause the client 100 to connect to the first server and load the data. The user-interface container is configured to cause the client 100 to display the data.

Each imaging application is running in a separate process and may connect to a different server. The imaging applications are installed on the client.

The imaging applications may be Rich Thin Client applications. Therefore, the UIs of the imaging applications, respectively, are stored on the client and the application business logic is available on the server. The server side business logic includes, for example, 3D image rendering, findings handling, result reporting. There is a Rich Thin Client imaging application on the client for each version of the application. By contrast, with a web browser, the web browser can display different versions of web applications (or thin clients) hosted on the application server. In example embodiments, the client hosts rich thin client applications with different versions installed on the client.

The memory 120 may include one or more memory modules. The memory modules may be separate physical memories (e.g., hard drives), separate partitions on a single physical memory and/or separate storage locations on a single partition of a single physical memory. The memory modules may store information associated with the installation of software (e.g., imaging processes).

The client 100 may be included in computed tomography. Each of the servers $170_1$-$170_n$ is associated with a different version of an application or a different application. For example, the servers $170_1$-$170_2$ may host versions 1 and 2 of application A, respectively, and the servers $170_3$-$170_n$ host applications B and C. Examples of applications are computed tomography (CT) Coronary, CT Vascular and CT Oncology, for example. The applications are medical imaging applications which are designed according to the images created by the acquisition system. Examples include a Coronary image analysis application, a Colon image analysis application and a cardio vascular application.

For the purposes of clarity, "different imaging application" may refer to a different version of an application, a different application and different versions of different imaging applications being based on different versions of the same product-line code.

It should be understood that a data processor, such as a digital signal processor or a microcontroller, is specifically programmed to execute the instructions stored in the memory 120. For example, the processor 110 is specifically programmed to execute instructions stored in the memory 120 such as the method of FIG. 2, which is described in greater detail below.

Figure 2:
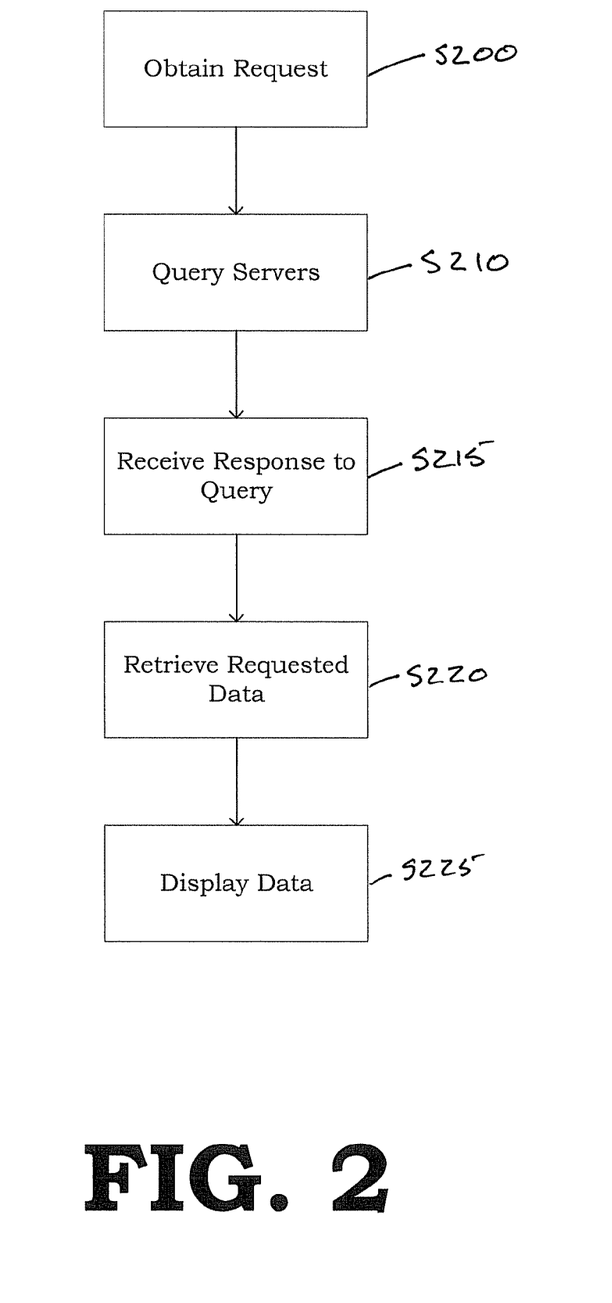
FIG. 2 illustrates a method of generating a user interface for a computer-based application according to an example embodiment.

FIG. 2 illustrates a method of generating a user interface for a computer-based application according to an example embodiment. The method of FIG. 2 includes obtaining, by a single client, a request for data from a patient browser, querying, by the single client, at least one of a plurality of servers for the requested data, each of the plurality of servers hosting a different imaging application, the imaging applications being independent of each other, receiving, by the single client, an indication, the indication indicating that a first server of the plurality of servers contains the requested data; and retrieving, by the single client, the requested data such that the associated server is transparent to the user.

The method of FIG. 2 may be executed by the processor 110 and may be stored in the memory 120. For example, the processor 110 is configured to obtain a request for data from a patient browser, query at least one of a plurality of servers for the requested data, receive an indication and retrieve the requested data. Each of the plurality of servers hosts a different imaging application and the imaging applications are independent of each other. The indication indicates that a first server of the plurality of servers contains the requested data and the associated server is transparent to the user.

Therefore, while the description of FIG. 2 refers to other parts of the client 100, it should be understood that the processor 110 is configured to process the input/output signals from the memory 120, the input/output device 130 and the display 140, thereby resulting in the method shown in FIG. 2

Figure 4:
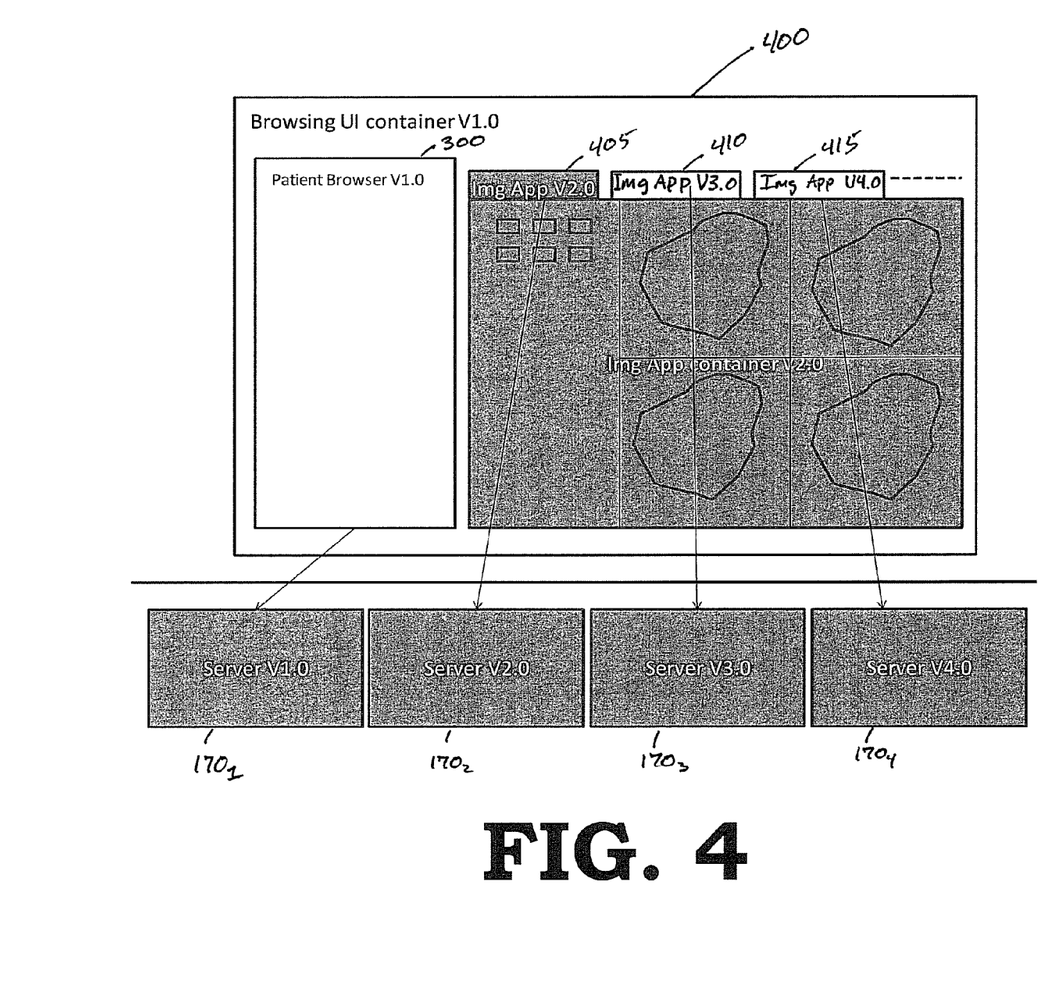
FIG. 4 illustrates a user interface according to an example embodiment.

At S200, the processor 110 receives a request for patient data from a user. For example, the display 140 of the client 100 may display a list of a plurality of patients in a patient browser of a browsing user interface. The browsing user interface is displayed by the processor 110 executing a browsing user-interface container that hosts the patient browser. The browsing UI container is a visible executable which is configured to host the UIs of the different imaging applications and the patient browser. The browsing UI container integrates all the imaging application UIs. Using such a UI frame, the user perceives the applications as belonging to one integrated system. FIG. 4 illustrates a browsing UI container, which is described in greater detail below.

The client 100 obtains the list of patients by querying all patients found on the servers $170_1$-$170_n$. The list of patients represents all patients who have data stored on the servers $170_1$-$170_n$.

The user selects one of the plurality patients via the input/output device 130, thereby generating a request for data associated with the selected patient. The browser is capable of providing a patient centric view as well as a study centric view. While the patient centric view displays all data/studies for a user, the study centric view provides a list of all studies available in the system.

At S210, the processor 110 queries at least the server storing the requested data for the requested data and a version of the application hosted by the server. More specifically, an image call-up application stored in the memory 120 is activated upon the user selecting the patient. By activating the image call-up application, the processor 110 obtains a patient ID and the name of the server storing the requested data. The patient ID is a unique identifier for the data to be loaded. For example, the patient ID may be the patient study ID defined by a user or acquisition device when the data were acquired.

The processor 110 is also configured to determine a position and size of the imaging application UI by executing the call-up application.

During the query at S210, the processor 110 queries the server storing the requested data for a version of the application hosted on the server.

The image call-up application is located on the client and starts the version of the imaging application using a protocol which is fixed for all application versions. The call-up application provides information (e.g. patient ID) used to load a study to the imaging application via a command line interface. The call-up application is invoked by the patient browser (in case the user selects a dedicated patient study) as well as from external applications (e.g., Radiology Information System (RIS)).

At S215, the processor 110 receives a response to the query from the server storing the requested data. The response indicates which version of the application is hosted on the queried server.

At S220, the processor 110 retrieves the requested data from the server storing the requested data. The memory 120 stores imaging applications associated with the servers, respectively. The processor 110 executes the imaging application that corresponds to the server storing the requested data. The processor 110 calls the imaging application using the version of the application, the server's name and the patient ID. Based on the version of the application, the server's name and the patient ID, the processor 110 loads the requested data.

At S225, the processor 110 executes the imaging application UI hosted within the user interface container and communicates the requested data to the display 140. The display 140 then displays the requested data. An imaging interface is displayed that is associated with the imaging application corresponding to the server storing the requested data. The imaging interface is determined by the processor 110 executing the user interface container. Because the processor 110 is configured to display requested data without a version request from the user, the server associated with the requested data is transparent to the user.

Figure 3:
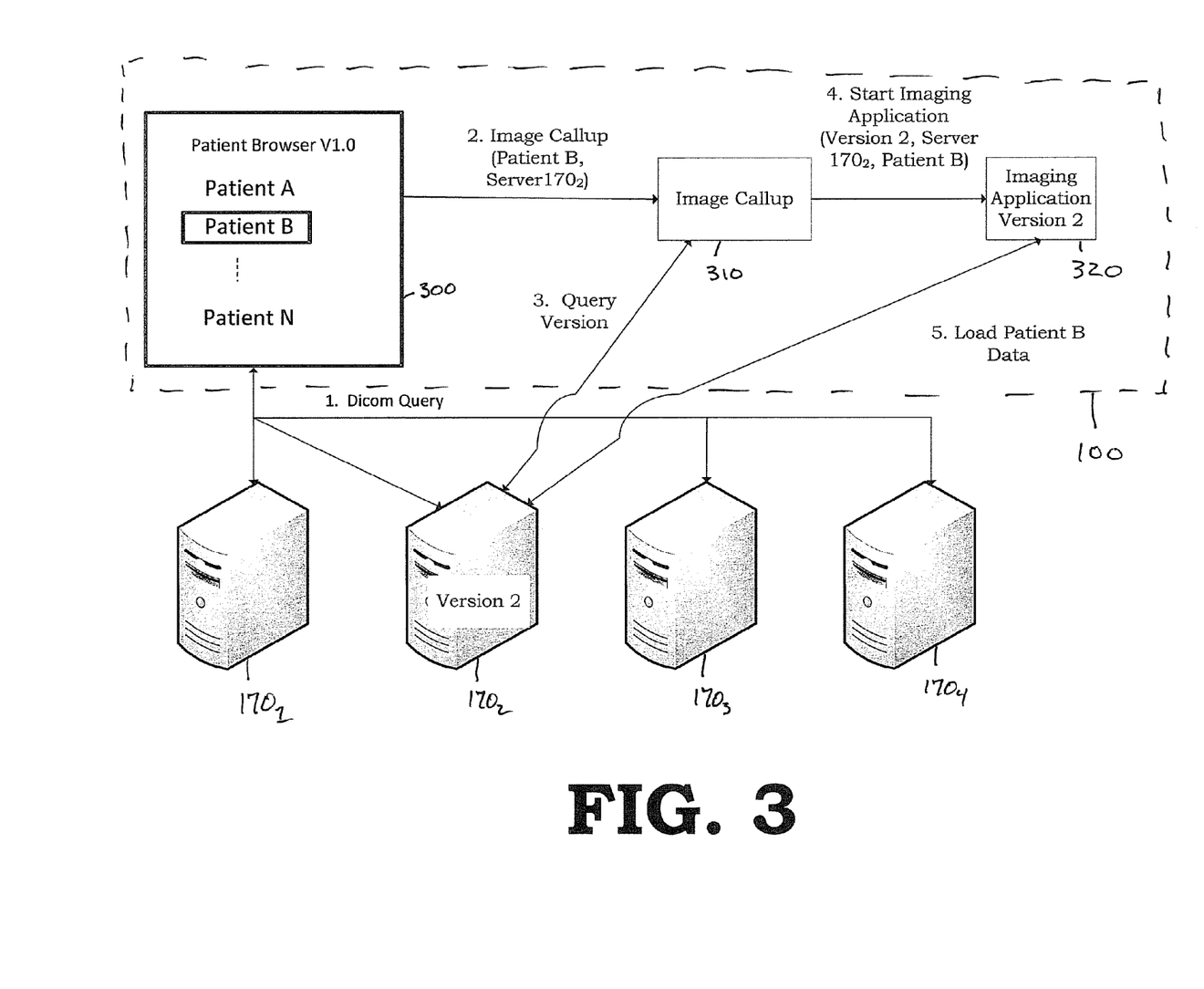
FIG. 3 illustrates an example embodiment of implementing the method of FIG. 2.

FIG. 3 illustrates an example embodiment of implementing the method of FIG. 2. While a patient browser 300, an image call-up application 310 and an imaging application 320 are described as executing functions, it should be understood that a data processor, such as a digital signal processor or a microcontroller, is specifically programmed to execute the patient browser 300, image call-up application 310 and imaging application 320. For example, the data processor 110 is specifically programmed to execute the patient browser 300, image call-up application 310 and imaging application 320.

As shown in FIG. 3, a patient browser 300 displays a list of patients. The patient browser 300 is displayed on the display 140 by the processor 110 executing the user interface container. The processor 110 supplies the patient browser 300 with the list of patients by querying all patients found on the servers $170_1$-$170_n$. The list of patients represents all patients who have data stored on the servers $170_1$-$170_n$.

In FIG. 3, the user requests the data associated with Patient B to be loaded. In the example of FIG. 3, the data associated with Patient B is stored on the server $170_2$. The request causes the processor 110 to activate the image call-up application 310. Activation of the image call-up application 310 from the patient browser 300 includes the patient ID (Patient B), the name of the server (server $170_2$) storing the requested data and the position and size the user interface should use on the display 140.

The image call-up application 310 queries the server $170_2$ to determine the version of the application being hosted on the server $170_2$. The server $170_2$ transmits a response indicating that the server $170_2$ is hosting version 2. The server is able to indicate which application it is hosting because data is mapped on the server to an application. The patient browser shows which mapping applies.

Upon receiving the response from the server $170_2$, the processor 110 calls the imaging application 320 corresponding to version 2. The server and the corresponding imaging application have the same version. The imaging application is started using the version of the server $170_2$, the identification of the server $170_2$ and the patient ID. The imaging application 320 loads the requested data from the server $170_2$ and displays the requested data in the user interface.

FIG. 4 illustrates a user interface according to an example embodiment.

As shown, a user interface includes a browsing UI container 400. The browsing UI container 400 is hosted on the client (e.g., the browsing UI container 400 is installed on the client). The patient browser 300 is also hosted on the client. As shown in FIG. 4, the server $170_1$ provides UI container 400 and the patient browser 300 installation packages. However, it should be understood that any of the servers $170_1$-$170_4$ may provide the UI container 400 and the patient browser 300 installation packages. The servers $170_1$-$170_4$ also provide the imaging application installation packages, respectively for the imaging application version which fits to that server.

As shown, the UI container 400 is configured to display the imaging application UIs respectively corresponding to the servers $170_2$-$170_4$. A user may view an imaging application by selecting a tab 405, 410, 415 corresponding to the imaging application. When an imaging application is started, the browser UI container 400 creates a new tab card and a panel associated to that tab card. Each tab card is associated which such a panel. The panel covers a part of the available screen and hosts the UI of the imaging application.

The size of the panel is passed to the imaging application as input parameter. The imaging application itself runs in a separate process but the UI of that process (or more precisely the Window Handle) is integrated into the panel which is associated with the tab card.

Figure 5:
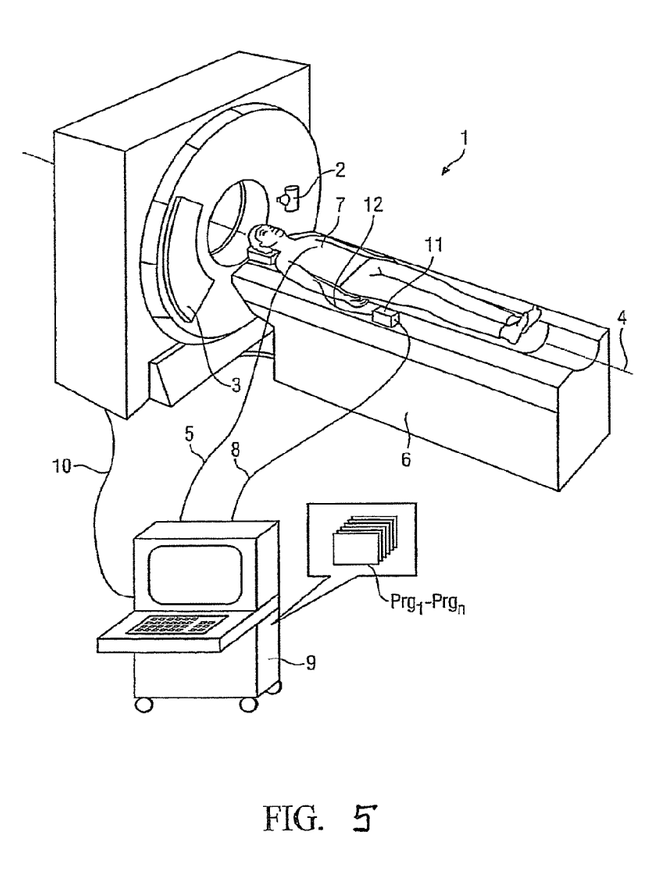
FIG. 5 illustrates an example embodiment of a system for computed tomography.

FIG. 5 illustrates an example embodiment of a system for computed tomography. The system for computed tomography 1 may be a medical work flow management system, for example. As shown in FIG. 5, the system for computed tomography 1 may include an X-ray tube 2, a detector 3, a system axis 4, an ECG lead 5, a displaceable patient couch 6, a patient 7, a control line for the injector 8, a control and arithmetic logic unit 9, a control and data line to the CT 10, an injector 11 on a contrast medium line 12.

As is illustrated by FIG. 5, the computed tomography system 1 may include the control and arithmetic logic unit 9 including data memories with programs $Prg_1$-$Prg_n$. As one skilled in the art will appreciate, individual method steps and control tasks may be distributed among different computers within the scope of the example embodiments. The control and arithmetic logic unit 9 shown here is connected via a control and data line 10 to the actual CT, which has an X-ray tube 2 and, oppositely thereto, a detector that is fastened on a gantry and can move on a circular track in order to scan the patient.

During a scanning operation, a patient 7 who is located on a couch 6 that can be displaced in the direction of the system axis 4, may be displaced in the direction of the system axis 4 such that, in the final analysis, spiral scanning takes place relative to the patient's coordinate system. The computed tomography system 1 additionally may include an ECG that is integrated in the arithmetic logic unit 9 and scans the heart rate of the patient 7 via the ECG line 5. Furthermore, the control and arithmetic logic unit 9 may use the control line 8 to operate an injector 11 with the aid of an integrated contrast medium pump, and via the hose line 12 depicted this injector 11 may inject the required contrast medium into the patient's 7 blood circulation at a prescribed flow rate.

According to an example embodiment, the programs $Prg_1$ to $Prg_n$ stored in the arithmetic logic and control unit 9 may firstly push the patient 7 so far into the beam path of the CT that a so-called pre-scan of a cardiac artery can be carried out. There is no feeding of the patient 7 in the case of this pre-scan, rather, a tomogram of the heart may be produced only in a plane of low dose rate in order to establish the contrast medium filling of an artery essential to the examination.

If the patient 7 is located in the correct pre-scan position, the injector 11 may inject contrast medium at a prescribed flow rate, and either the operator may use the reconstructed tomogram output on an illustration screen to establish when there is a sufficient contrast medium filling in the observed cardiac artery, or an appropriate program can establish via automatic image processing whether sufficient contrast is present in the reconstructed image for a good illustration of the arteries.

As one skilled in the art will appreciate, CT system 1 may include several cooperating applications (e.g., $Prg_1$-$Prg_n$). According to example embodiments, the example embodiments shown in FIGS. 1-4 may be deployed on CT system 1.

For example, arithmetic logic unit 9 may be the client 100.

Although the above example was described with regard to a computed tomography system, example embodiments are not limited thereto. For example, a system of an example embodiment of the present application may be another type of imaging system (e.g., MRI, PET, etc.). Further, example embodiments are not limited to scanning (acquisition) steps of the clinical workflow. For example, example embodiments may be related to post processing, reading, and reporting workflow steps. Further, example embodiments are not limited to imaging systems. For example, example embodiments may be related to a clinical study system or other health care management system.

Alternative embodiments of the invention may be implemented as a computer program product for use with a computer system, the processor program product being, for example, a series of processor instructions, code segments or program segments stored on a tangible or non-transitory data recording medium (processor readable medium), such as a diskette, CD-ROM, ROM, or fixed disk, or embodied in a computer data signal, the signal being transmitted over a tangible medium or a wireless medium, for example, microwave or infrared. The series of processor instructions, code segments or program segments can constitute all or part of the functionality of the methods of example embodiments described above, and may also be stored in any memory device, volatile or non-volatile, such as semiconductor, magnetic, optical or other memory device.

One embodiment of the present application includes a computer readable medium. The computer readable medium includes code segments that, when executed by a processor cause the processor to intercept an application installation procedure, classify the application, determine information associated with the application and install the application based on the classification and the determined information. Installing the application may further include determining compatibility information of one or more target nodes and adding the application to at least one of the target nodes if the application compatibility information and the compatibility of the at least one target node is confirmed.

Although the above example was described with regard to a computed tomography system, example embodiments are not limited thereto. For example, system may be another imaging system (e.g., MRI, PET, etc.). Further, example embodiments are not limited to imaging systems. For example, example embodiments may be related to a clinical study system or other health care management system. Further, as one skilled in the art will appreciate, example embodiments may be related to any system using several cooperating applications such as manufacturing equipment (e.g., robots) or cloud computing environments, but are not limited thereto.

While example embodiments have been particularly shown and described, it will be understood by one of ordinary skill in the art that variations in form and detail may be made therein without departing from the spirit and scope of the claims. The invention being thus described, it will be obvious that the same may be varied in many ways. Such variations are not to be regarded as a departure from the invention, and all such modifications are intended to be included within the scope of the invention.

We claim:

1. A method of generating a user interface in a computer-based application, the method comprising:
   obtaining, by a single client, a request for data from a patient browser;
   first querying, by the single client, at least one of a plurality of servers for the requested data, each of the plurality of servers hosting a different imaging application, the imaging applications being independent of each other;
   receiving, by the single client, an indication, the indication indicating that a first server of the plurality of servers contains the requested data;
   second querying the first server to determine a version of the imaging application associated with the first server after the receiving; and
   retrieving, by the single client, the requested data such that the associated server is transparent to the user.

2. The method of claim 1, further comprising:
   displaying the requested data.

3. The method of claim 1, wherein the different imaging applications are different versions of the same imaging application.

4. The method of claim 1, wherein the user does not select the version of the imaging application associated with the server containing the requested content.

5. The method of claim 1, further comprising:
   hosting, by a user interface container in the client, the patient browser and a plurality of imaging interfaces, the plurality of imaging interfaces associated with the imaging applications, respectively.

6. The method of claim 5, further comprising:
   displaying at least a portion of each of the patient browser and each imaging interface.

7. The method of claim 1, wherein the request identifies a patient.

8. The method of claim 1, further comprising:
   third querying the plurality of servers to determine patients; and
   displaying, by the client, the patients.

9. A non-transitory computer readable medium configured to be executed on a computer comprising:
   a user-interface container configured to host a patient browser; and
   a plurality of imaging applications, each of the imaging applications being independent and associated with a server, the user-interface container configured to display the patient browser and data in at least a first server of the plurality of servers, a location of the first server being transparent to the user; and
   an image call-up configured to cause the computer to query the first server to determine a version of the imaging application associated with the first server and initiate the imaging application associated with the first server.

10. The non-transitory computer readable medium of claim 9, the image call-up is configured to cause the computer to connect to the first server and load the data.

11. The non-transitory computer readable medium of claim 10, the user-interface container is configured to cause the computer to display the data.

12. A system comprising:
    a memory configured to store instructions; and
    a processor configured to access the memory and execute the instructions, the processor configured to,
    obtain a request for data from a patient browser;
    query at least one of a plurality of servers for the requested data, each of the plurality of servers hosting a different imaging application, the imaging applications being independent of each other;
    receive an indication, the indication indicating that a first server of the plurality of servers contains the requested data;
    query the first server to determine a version of the imaging application associated with the first server after receiving the indication; and
    retrieve the requested data such that the associated server is transparent to the user.

13. The system of claim 12, wherein the different imaging applications are different versions of the same imaging application.

14. The system of claim 12, wherein the user does not select the version of the imaging application associated with the server containing the requested content.

15. The system of claim 12, wherein the processor is further configured to host the patient browser and a plurality of imaging interfaces, the plurality of imaging interfaces associated with the imaging applications, respectively.

16. The system of claim 12, wherein the processor is further configured to query the plurality of servers to determine patients and display the patients.

* * * * *